US008312203B2

(12) United States Patent
Mizushima

(10) Patent No.: US 8,312,203 B2
(45) Date of Patent: Nov. 13, 2012

(54) SEMICONDUCTOR STORAGE DEVICE AND METHOD OF CONTROLLING A SEMICONDUCTOR STORAGE DEVICE BY ALLOCATING A PHYSICAL BLOCK COMPOSED OF PLURAL PAGES TO A GROUP OF LOGICAL ADDRESSES

(75) Inventor: Nagamasa Mizushima, Machida (JP)

(73) Assignee: Hitachi, Ltd., Tokyo (JP)

( * ) Notice: Subject to any disclaimer, the term of this patent is extended or adjusted under 35 U.S.C. 154(b) by 473 days.

(21) Appl. No.: 12/017,615

(22) Filed: Jan. 22, 2008

(65) Prior Publication Data
US 2009/0070520 A1    Mar. 12, 2009

(30) Foreign Application Priority Data

Sep. 6, 2007   (JP) .................................. 2007-231640

(51) Int. Cl.
*G06F 12/02* (2006.01)
(52) U.S. Cl. ................................. 711/103; 711/E12.008
(58) Field of Classification Search .......................... None
See application file for complete search history.

(56) References Cited

U.S. PATENT DOCUMENTS

| 7,039,788 | B1 * | 5/2006 | Chang et al. ................. 711/203 |
| 7,254,668 | B1 * | 8/2007 | Chang et al. ................. 711/103 |
| 2002/0099904 | A1 * | 7/2002 | Conley .......................... 711/103 |
| 2005/0141312 | A1 * | 6/2005 | Sinclair et al. ............... 365/222 |
| 2005/0144360 | A1 * | 6/2005 | Bennett et al. ............... 711/103 |
| 2005/0193161 | A1 * | 9/2005 | Lee et al. ..................... 711/103 |
| 2006/0004971 | A1 * | 1/2006 | Kim et al. .................... 711/154 |
| 2006/0161722 | A1 * | 7/2006 | Bennett et al. ............... 711/103 |
| 2007/0028035 | A1 | 2/2007 | Nishihara |
| 2007/0094445 | A1 | 4/2007 | Trika et al. |
| 2007/0143571 | A1 * | 6/2007 | Sinclair et al. ............... 711/203 |
| 2007/0276988 | A1 * | 11/2007 | Luo et al. ..................... 711/103 |

(Continued)

FOREIGN PATENT DOCUMENTS

JP    2004533029    10/2004

(Continued)

OTHER PUBLICATIONS

Eran Gal and Sivan Toledo. "Algorithms and Data Structures for Flash Memories." Jun. 2005. ACM. ACM Computing Surveys. vol. 37. No. 2. pp. 138-163.*

(Continued)

*Primary Examiner* — Charles Rones
*Assistant Examiner* — Nathan N Sadler
(74) *Attorney, Agent, or Firm* — Brundidge & Stanger, P.C.

(57) ABSTRACT

In a semiconductor storage device, a memory controller divides each of blocks in each of chips into a first page set composed of pages and a second page set composed of pages, divides a logical address space into groups, and divides each group into lines. Block units are created each of which is obtained by assembling a predetermined number of blocks from the blocks in each chip. A predetermined number of block units from the block units are managed as standard block units, and the other block units are managed as spare block units. Each standard block unit is made to correspond to one group. The corresponding group data is stored in the pages in the first page set in each block constituting the standard block unit, and unwritten pages for recording update data for the group data are provided to be included in the second page set.

5 Claims, 15 Drawing Sheets

U.S. PATENT DOCUMENTS

2011/0029724 A1    2/2011    Conley .................... 711/103

FOREIGN PATENT DOCUMENTS

| JP | 2006-127234 | 5/2006 |
|---|---|---|
| JP | 2007058840 | 3/2007 |
| JP | 2007094571 | 4/2007 |
| WO | WO 02/058074 | 7/2002 |

OTHER PUBLICATIONS

Chanik Park, Wonmoon Cheon, Yangsup Lee, Myoung-Soo Jung, Wonhee Cho, and Hanbin Yoon. "A Re-configurable FTL (Flash Translation Layer) Architecture for NAND Flash based Applications." May 2007. IEEE. RSP 2007.*

Tae-Sun Chung, Dong-Joo Park, Sangwon Park, Dong-Ho Lee, Sang-Won Lee, and Ha-Joo Song. "System Software for Flash Memory: A Survey." Aug. 2006. Springer. Lecture Notes in Computer Science. vol. 4096. pp. 394-404.*

Sang-Won Lee and Bongki Moon. "Design of Flash-Based DBMS: An In-Page Logging Approach." Jun. 2007. ACM. SIGMOD 2007.*

Jeong-Uk Kang, Heeseung Jo, Jin-Soo Kim, and Joonwon Lee. "A Superblock-based Flash Translation Layer for NAND Flash Memory." Oct. 2006. ACM. EMSOFT '06.*

\* cited by examiner

FIG.9

| CHIP | BLOCK |
|---|---|
| 0 | 2a,2a+1 |
| 1 | 2b,2b+1 |
| 2 | 2c,2c+1 |
| 3 | 2d,2d+1 |
| ⋮ | ⋮ |
| 15 | 2p,2p+1 |

3200 — 3201 3202

3300 — 3301 3302 3303 3304 3305 3306

| PAGE | CHIP | PLANE | TARGET SECTOR | ORIGINAL ADDRESS | STATE |
|---|---|---|---|---|---|
| 60 | 0 | 0 | 0010 | 1 | VALID |
| | | 1 | 0110 | 36 | INVALID ~3311 |
| | 1 | 0 | 0010 | 32 | VALID |
| | | 1 | 1100 | 35 | VALID |
| | 2 | 0 | 0011 | 30 | VALID |
| | | 1 | 0110 | 36 | VALID ~3310 |
| | 3 | 0 | | | BLANK |
| | | 1 | | | BLANK |
| | ⋮ | ⋮ | ⋮ | ⋮ | ⋮ |
| | 15 | 0 | | | BLANK |
| | | 1 | | | BLANK |
| 61 | | | | | |
| 62 | | | | | |
| 63 | | | | | |

FIG.11

| CHIP | BLOCK |
|---|---|
| 0 | 2a',2a'+1 |
| 1 | 2b',2b'+1 |
| 2 | 2c',2c'+1 |
| 3 | 2d,2d+1 |
| ... | ... |
| 15 | 2p',2p'+1 |

4200
4201 4202

4300
4301 4302 4303 4304 4305 4306

| PAGE | CHIP | PLANE | TARGET SECTOR | ORIGINAL ADDRESS | STATE |
|---|---|---|---|---|---|
| 60 | 0 | 0 | | | BLANK |
| | | 1 | | | BLANK |
| | 1 | 0 | | | BLANK |
| | | 1 | | | BLANK |
| | 2 | 0 | | | BLANK |
| | | 1 | | | BLANK |
| | 3 | 0 | | | BLANK |
| | | 1 | | | BLANK |
| | ... | ... | ... | ... | ... |
| | 15 | 0 | | | BLANK |
| | | 1 | | | BLANK |
| 61 | | | | | |
| 62 | | | | | |
| 63 | | | | | |

SEMICONDUCTOR STORAGE DEVICE AND METHOD OF CONTROLLING A SEMICONDUCTOR STORAGE DEVICE BY ALLOCATING A PHYSICAL BLOCK COMPOSED OF PLURAL PAGES TO A GROUP OF LOGICAL ADDRESSES

CROSS-REFERENCES TO RELATED APPLICATIONS

This application relates to and claims priority from Japanese Patent Application No. 2007-231640, filed on Sep. 6, 2007, the entire disclosure of which is incorporated herein by reference.

BACKGROUND

1. Field of the Invention

The invention relates to a semiconductor storage device and a method of controlling the semiconductor storage device, and is particularly suitable for use in a semiconductor storage device using an electrically rewritable non-volatile memory as a storage medium and a method of controlling the semiconductor storage device.

2. Description of Related Art

A semiconductor storage device in which data in a logical block is distributed to plural flash memory physical blocks to be stored, and when the data stored in each of the physical blocks is updated, the relevant update data is recorded in a blank page in the physical block, and the original stored data is invalidated; and in which, if the physical block lacks a blank page, latest update data in the physical block is merged into the stored data and the resultant data is copied to another physical block, a new blank page is reserved, and subsequent update data is recorded in the blank page is a known storage device (see e.g., U.S. Pat. No. 7,039,788). Note that "merge" means that an old piece of data is replaced by the latest piece of data to build the latest data.

Also, a method of managing virtual blocks for a semiconductor storage device provided with plural flash memory chips and in which physical blocks in the respective chips are assembled into virtual blocks and read/write to the chips is conducted via parallel processing is known (see e.g., JP2006-127234 A).

When a control method in which blank pages in a physical block are utilized to record update data, which is as shown in U.S. Pat. No. 7,039,788, is utilized in the semiconductor storage device provided with plural flash memory chips, and the chips are subjected to parallel processing to improve performance, which is as shown in JP2006-127234 A, the parallel processing involving the chips may be executed inefficiently, due to the recorded state of the update data, leading to deterioration in write/read performance.

SUMMARY

The invention has been made in light of the above, and an object of the invention is to provide a semiconductor storage device that enables prevention of deterioration in performance and a method of controlling the semiconductor storage device.

The semiconductor storage device according to the invention is provided with a memory controller and plural flash memory chips. Each of blocks in each of the chips is divided into a first page set composed of plural pages and a second page set composed of plural pages. A logical address space is divided into plural groups, and each of the groups is divided into plural lines. Then, plural block units are created each of which is obtained by assembling a predetermined number of blocks from the blocks in each of the chips. A predetermined number of block units from the block units are managed as standard block units, and the other block units are managed as spare block units. Each of the standard block units is made to correspond to one group. The corresponding group data is stored in the pages in the first page set in each of the blocks constituting the standard block unit; and unwritten pages for recording update data for the group data are provided to be included in the pages in the second page set.

When the semiconductor storage device receives a write address and write data in response to a write command, the memory controller identifies the group and the line that include the write address; selects one of the chips that satisfies a predetermined condition concerning the second page set; and writes the write data in the unwritten page in the second page set in the selected chip as update data for the data in the identified group/line.

The predetermined condition specifies one of the flash memory chips including at least one unwritten page in the second page set belonging to the standard block unit corresponding to the identified group, the one having the smallest number of recorded pages for the update data for the data in the identified line.

With the above configuration, in a semiconductor storage device configured to execute parallel processing to plural flash memory chips and that performs memory control to record update data by using blank pages in a physical block in each chip, memory command tasks to be subjected to parallel processing are uniformly distributed to the memory chips during data merge copy executed in the device when writing the data from the device, or during reading data to the device. This reduces the time each chip is in an idle state. Accordingly, the effect of preventing deterioration in write/read performance of the device can be obtained.

According to the invention, a semiconductor storage device that enables prevention of deterioration in performance and a method of controlling the semiconductor storage device can be provided.

BRIEF DESCRIPTION OF THE DRAWINGS

FIG. 9 is a diagram showing tables that manage the state of data recording when update data is recorded in update data pages in a standard block unit according to the invention.

FIG. 11 is a diagram showing tables that manage the state of copy to a spare block unit when the update data recorded in a standard block unit according to the invention is merged into group data; and the resultant group data is copied to the spare block unit.

DETAILED DESCRIPTION OF PREFERRED EMBODIMENTS

An embodiment of the present invention will be described with reference to the accompanying drawings.

Figure 1:
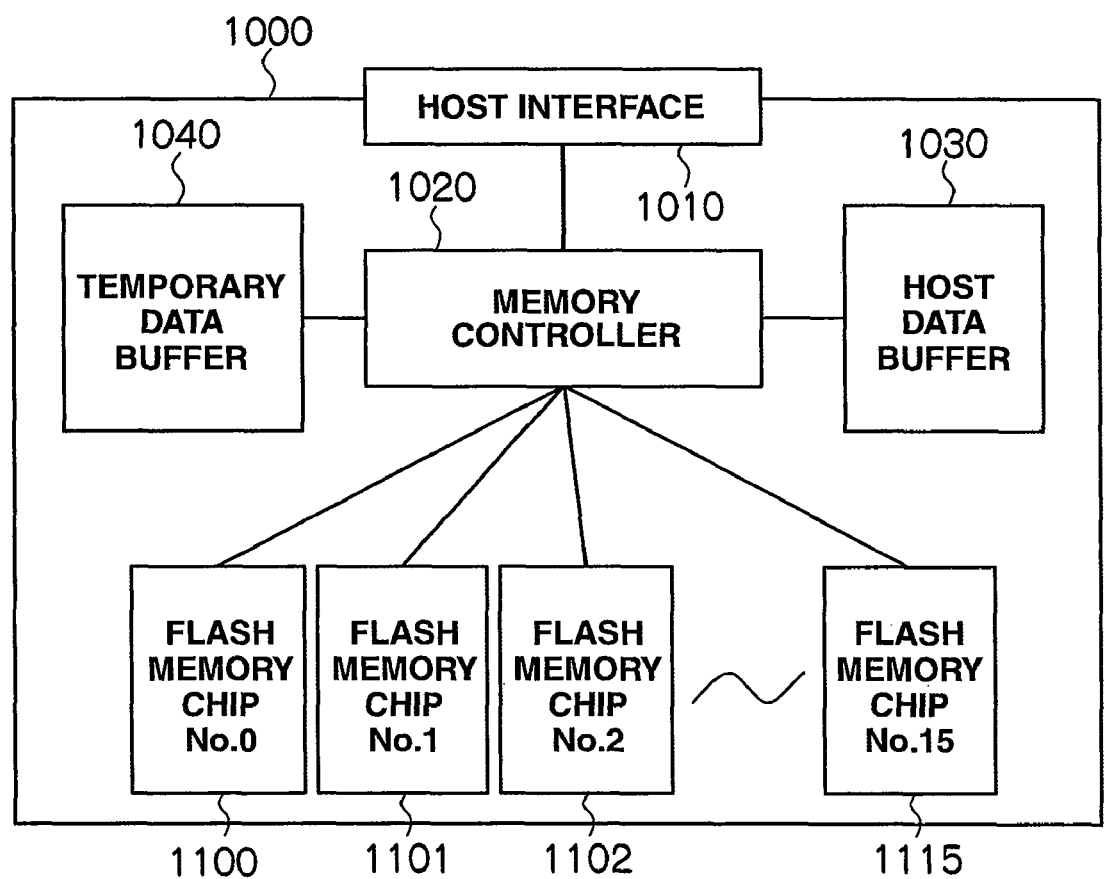
FIG. 1 is a diagram briefly showing an internal configuration for a semiconductor storage device according to the invention.

FIG. 1 is a diagram briefly showing an internal configuration for a semiconductor storage device 1000 that utilizes the invention. The semiconductor storage device 1000 is composed of a host interface 1010, a memory controller 1020, a host data buffer 1030, a temporary data buffer 1040, and plural (e.g., 16) flash memory chips 1100 to 1115.

The host interface 1010 is an interface mechanism connected to an external host(s) (not shown in the drawing), and transmits data stored in the flash memory chips 1100 to 1115 to the host and receives write data to be stored in the flash memory chips 1100 to 1115 from the host in response to read/write request commands from the host.

Incidentally, the host specifies a logical storage position for the data requested to be subject to read/write by using a logical address (hereinafter referred to as "LBA (Logical Block Address)"). The logical address is a virtual address different from a physical address used when the memory controller 1020 accesses the flash memory chips 1100 to 1115.

The mechanism of the host interface 1010 and the protocol for the transmission and receipt of commands and data preferably conform to an interface specification (e.g., parallel ATA, serial ATA, or SCSI) compatible with a standard hard disk device.

The host data buffer 1030 is volatile memory mainly composed of RAM (Random Access Memory). The write data received in response to a write request from a host is stored in the host data buffer 1030 until a predetermined data amount to be input in the flash memory chips 1100 to 1115 is reached, and then is written in the flash memory chips 1100 to 1115. Also, the read data to be transmitted in response to a read request from a host is read from the flash memory chips 1100 to 1115, and then is stored in the host data buffer 1030 until a predetermined data amount to be output to the host is reached.

The temporary data buffer 1040 is volatile memory mainly composed of RAM. When the data stored in a physical address in the flash memory chips 1100 to 1115 needs to be moved to another physical address, the relevant data read from the flash memory chips 1100 to 1115 is temporarily held in the temporary data buffer 1040.

The memory controller 1020 is connected to the host interface 1010, the host data buffer 1030, the temporary data buffer 1040, and the flash memory chips 1100 to 1115, and is a microprocessor that controls the above components.

As described above, the memory controller 1020 executes interpretation of read/write request commands from a host, data transmission/receipt with the host, access to the host data buffer 1030 and the temporary data buffer 1040 (read/write), and access (read/program/erase) to the flash memory chips 1100 to 1115. Also, the memory controller 1020 manages an address map via a table concerning to which physical address in the flash memory chip the LBA specified by a host corresponds. The memory controller 1020 incorporates volatile memory such as RAM, and creates the table in the memory when the semiconductor storage device 1000 is powered-on. (The kind of table it is will be described with reference to FIG. 9.) The memory controller 1020 also executes calculation and verification of ECCs (Error Correction Codes) for ensuring the validity of the data stored in the flash memory chips 1100 to 1115. Note that the address map table does not need to be in the memory controller and may be anywhere as long as it is located in volatile memory accessible by the memory controller 1020.

Figure 2:
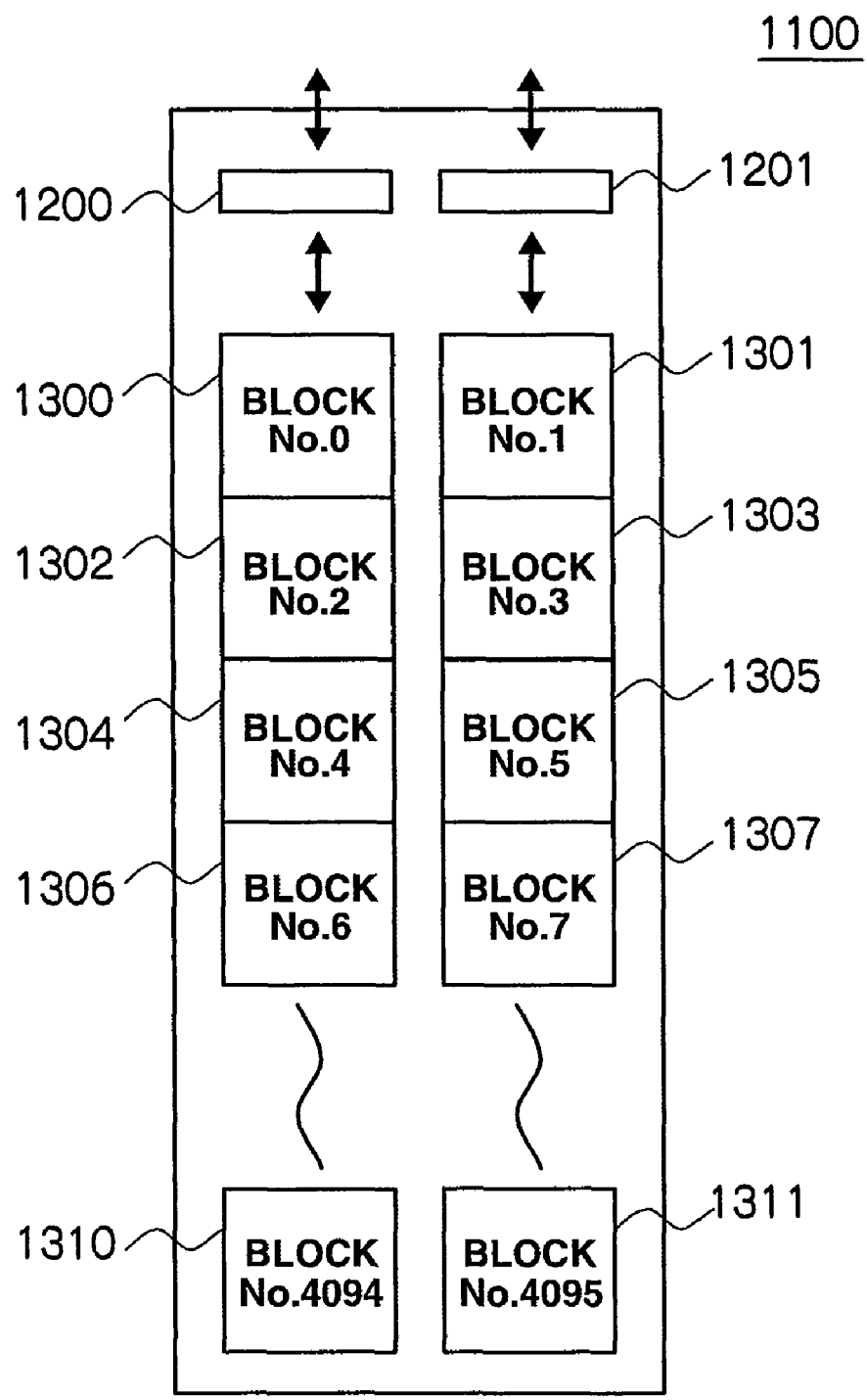
FIG. 2 is a diagram showing a configuration for a flash memory chip according to the invention.

FIG. 2 is a diagram showing a configuration for the flash memory chip 1100. An explanation and drawings for the other flash memory chips 1101 to 1115 are omitted, as the chips each have the same configuration as that for the flash memory chip 1100.

A non-volatile memory area in the flash memory chip 1100 is composed of plural (e.g., 4,096) blocks 1300 to 1311. The stored data is erased on a block basis. Each of the blocks is composed of plural (e.g., 64) pages 1400 to 1463. The data to be stored in the flash memory chip 1100 is programmed on a page basis.

Figure 3:
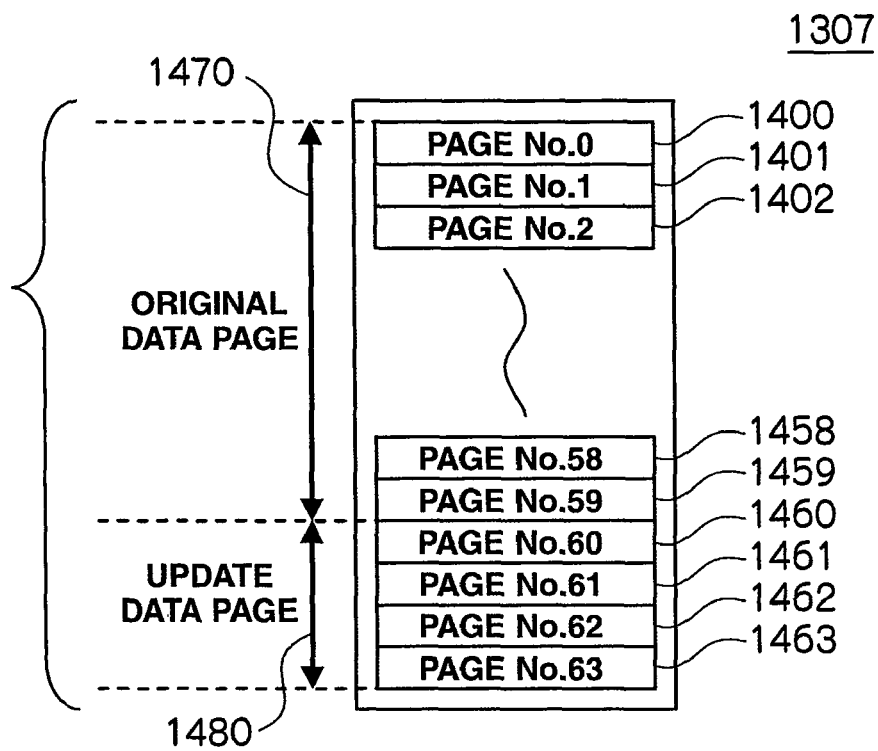
FIG. 3 is a diagram showing a configuration for a block according to the invention.

FIG. 3 is a diagram showing a configuration for a block 1307. An explanation and drawings for the other blocks 1300 to 1306 and 1308 to 1311 are omitted, as the blocks each have the same configuration as that for the block 1307.

The programming order for 64 pages in the block 1307 is fixed, and the pages need to be programmed in the order of 1400, 1401, ..., 1463. Also, overwriting to an already-programmed page is prohibited, and unless the block the page belongs to is erased, the page cannot be reprogrammed.

Figure 4:
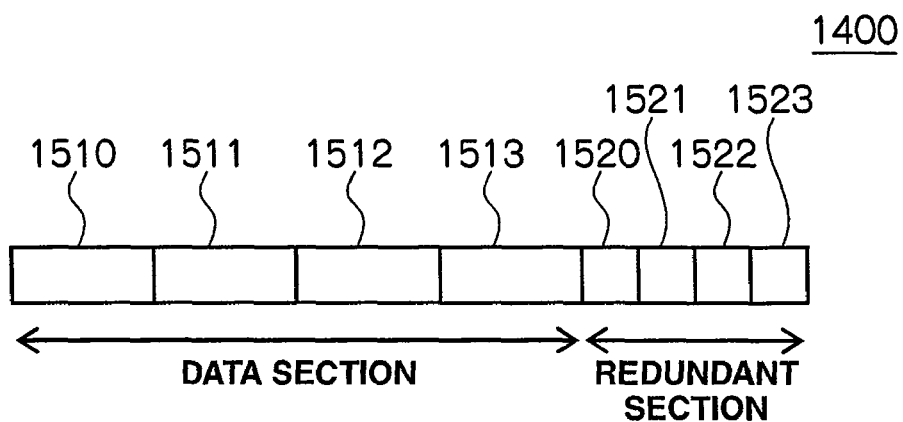
FIG. 4 is a diagram showing a page configuration according to the invention.

FIG. 4 is a diagram showing a configuration for the page 1400. Note that an explanation and drawings for the other pages 1401 to 1463 are omitted, as the pages each have the same configuration as that for the page 1400.

The page 1400 is composed of a data unit for storing plural (e.g., four) pieces of sector data 1510 to 1513 (512 byte for each) and redundant parts for storing information pieces 1520 to 1523 (16 byte for each) about the sector data. The data stored in the page can be read on a sector basis. The memory controller 1020 stores the ECCs for ensuring the content of each piece of the sector data and the LBAs for each piece of the sector data in the redundant section.

As shown in FIG. 2, the blocks are numbered 0 to 4095 in the flash memory chip 1100, and the set of even-numbered blocks and the set of odd-numbered blocks are referred to plane 0 and plane 1 respectively. Page registers (1200, 1201) are provided for the respective planes, and data read from a page included in a block in either of the planes or data to be programmed in the page is temporarily stored in the relevant page register. Each plane independently has an erase/program circuit, and two adjacent blocks (i.e., two blocks 2X and (2X+1) with integer X=0 to 2,047) can be erased simultaneously. Also, the two pages with the same numbers in the two adjacent blocks can be programmed simultaneously. Note that a read circuit is common to the planes, and read can be conducted only on a per-page basis.

The memory controller 1020 divides the 64 pages constituting each block into two in terms of data management application. As shown in FIG. 3, the first 60 pages (1400 to 1459) are referred to as original data pages 1470, and the later four pages (1460 to 1463) are referred to as update data pages 1480. Note that this classification is logic, and both the pages have no difference in physical configuration.

Figure 5:
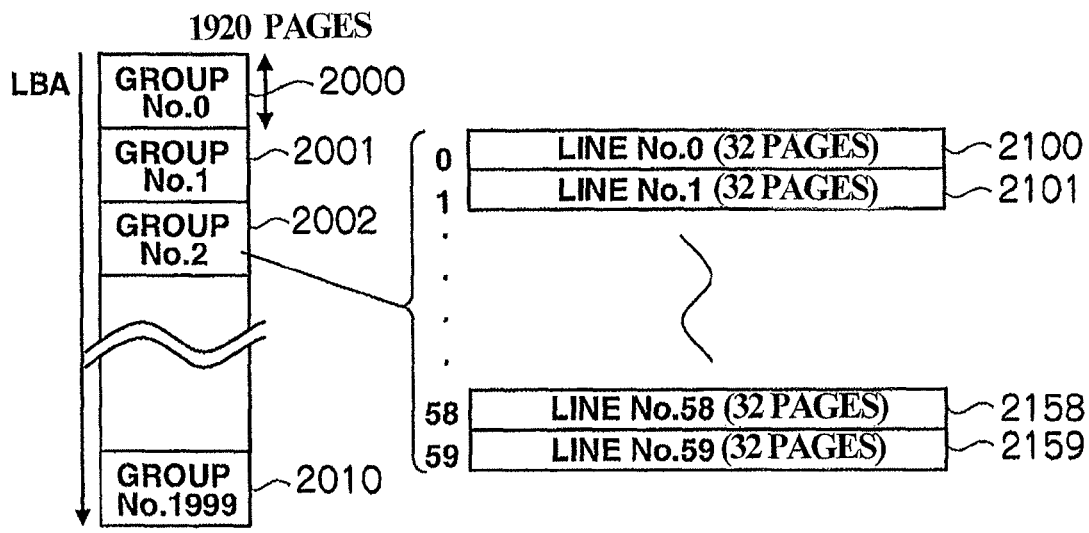
FIG. 5 is one of the diagrams showing a method of arranging a logical address space in a semiconductor storage device according to the invention into a physical address space in flash memory.
Figure 6:
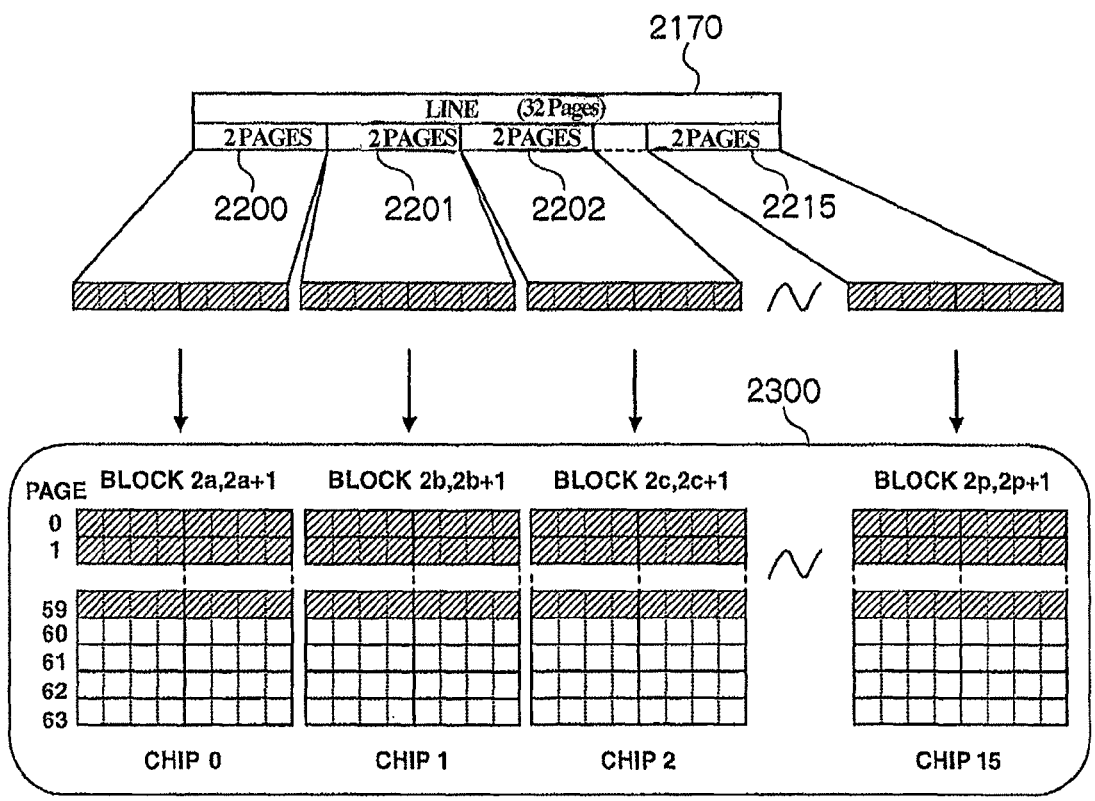
FIG. 6 is one of the diagrams showing a method of arranging a logical address space in a semiconductor storage device according to the invention into a physical address space in flash memory.
Figure 7:
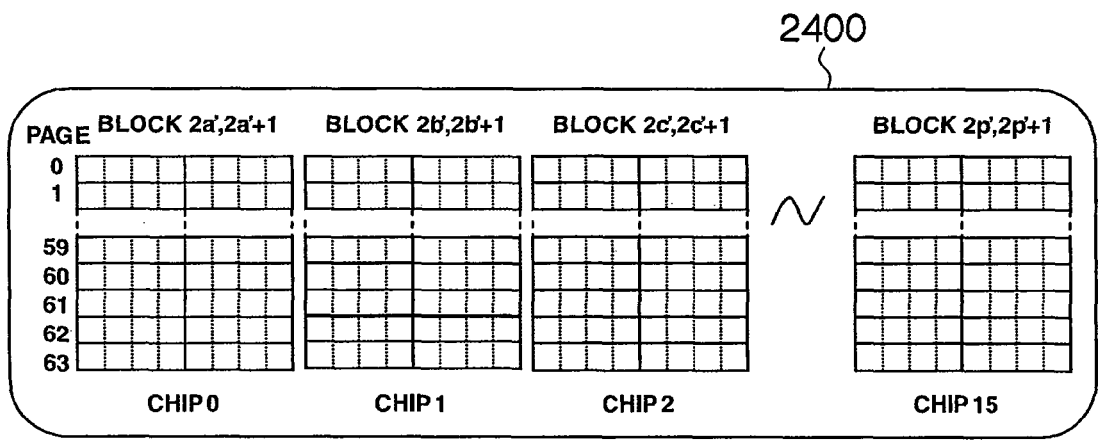
FIG. 7 is one of the diagrams showing a method of arranging a logical address space in a semiconductor storage device according to the invention into a physical address space in flash memory.

FIGS. 5 to 7 are diagrams explaining how the memory controller 1020 stores the data in the logical space expressed by LBAs in the blocks/pages in the flash memory chips 1100 to 1115.

As shown in FIG. 5, the logical space expressed by LBAs is first divided into plural groups with 1920 pages serving as a group. For example, the space is divided into 2,000 groups numbered 0 to 1999 (groups 2000 to 2010 are shown in the diagram). Then, each of the groups is divided into 60 lines 2100 to 2159 with 32 pages serving as a line. The lines are numbered 0 to 59.

As shown in FIG. 6, each line 2170 is divided into 16 parts (2200 to 2215) on a two-page basis. Meanwhile, adjacent block pairs are selected from the respective 16 chips to constitute a block unit 2300 consisting of 32 blocks. FIG. 6 shows an example where two blocks 2a and (2a+1) from chip 0, two blocks 2b and (2b+1) from chip 1, two blocks 2c and (2c+1) from chip 2, and two blocks 2p and (2p+1) from chip 15 are selected. 2,000 block units like the block unit 2300 are created and numbered 0 to 1999. These are referred to as standard block units.

Also, two blocks, which have not been selected for the standard block units (2300, etc.), are selected from each of the 16 chips to constitute a block unit 2400 consisting of 32 blocks. FIG. 7 shows an example where two blocks 2a' and (2a'+1) from chip 0, two blocks 2b' and (2b'+1) from chip 1, two blocks 2c' and (2c'+1) from chip 2, and two blocks 2p' and (2p'+1) from chip 15 are selected. As many block units like the block unit 2400 as possible are created. These are referred to as spare block units. If the 16 chips have no defective blocks, 48 (maximum) spare block units (2400, etc.) can be created.

The N-th standard block unit 2300 is assigned to serve as the data storage destination for the N-th group. Here, N=0 to 1999 is satisfied. In addition, the M-th page for each block in two adjacent-block pairs in the standard block unit is assigned to serve as the data storage destination for the M-th line in the group. Here, M=0 to 59 is satisfied. The M-th page in each of chips 0 to 15 is assigned to serve as the data storage destination for each of 16 pieces (2200 to 2215) obtained by dividing the line. In other words, a shaded part (1,920 pages) in the standard block unit 2300 serves as the storage destination for group data. This corresponds to the sets of the original data pages 1470 (60 pages) in FIG. 3 for two blocks×16 chips. As a result, an unwritten area for 128 pages is left in the standard block unit 2300. The area corresponds to the sets of update data pages 1480 (four pages) in FIG. 3 for two blocks×16 chips. The memory controller 1020 utilizes the unwritten area as a record destination for update data when the group data in the shaded part is partially updated.

Meanwhile, the spare block unit 2400 has not been assigned to serve as a storage destination for group data, and is entirely in an unwritten state. When the unwritten area in a standard block unit 2300 becomes full with update data, the memory controller 1020 selects one spare block unit, and copies only the valid data in the standard block unit 2300 to the original data pages 1470 in the spare block unit 2400. After this, the spare block unit 2400 is used as a new standard block unit 2300. The copy source standard block unit 2300 is subjected to data erase to be recycled as a new spare block unit 2400.

Figure 8:
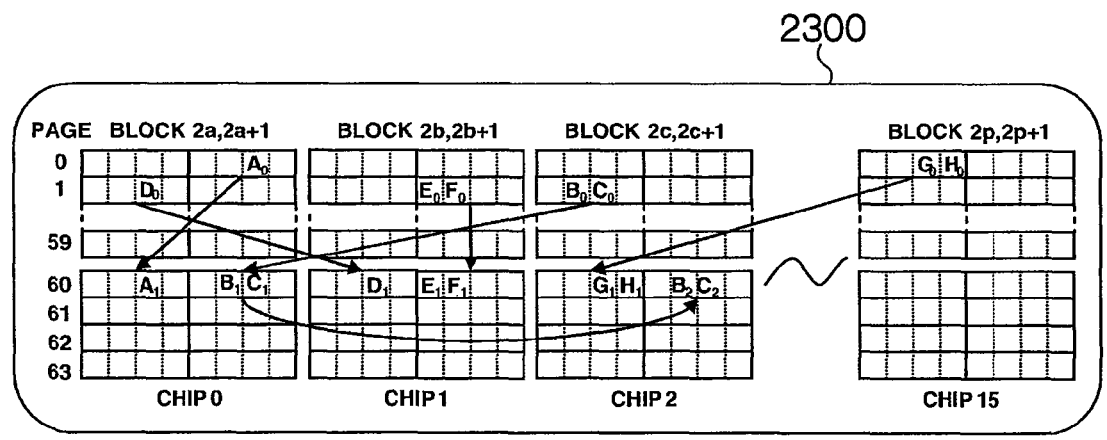
FIG. 8 is a diagram explaining a method of recording update data in update data pages in a standard block unit according to the invention.

FIG. 8 is a diagram showing the state of progress of update data recording when part of the group data stored in the standard block unit 2300 is updated. The update-target group data is managed on a page basis. A page address for the update-target group data is referred to as an original address. Original address W for the data stored in the page in plane Z on chip Y in line X is expressed by $W=32X+2Y+Z$. The possible value of W ranges from 0 to 127. Here, integer X=0 to 59, integer Y=0 to 15, and integer Z=0 or 1 are satisfied.

FIG. 9 is a diagram showing a block map table 3200, which manages the addresses of the sixteen pairs of adjacent block pairs that constitute the standard block unit 2300 assigned to group data, and an update data map table 3300, which manages the update data recorded in the unwritten area in the standard block unit 2300. Both the tables are configured in the volatile RAM included in the memory controller 1020.

The block map table 3200 records the addresses for two adjacent blocks for each of the 16 chips (0 to 15), and so is configured as a table in which a chip number 3201 corresponds to a block number 3202. The memory controller 1020 holds block map tables 3200 equivalent in number to the total number of standard block units 2300, i.e., 2,000.

The update data map table 3300 is configured to manage corresponding original addresses with an update destination page in an unwritten area as an index. The memory controller 1020 holds update data map tables 3300 equivalent in number to the total number of standard block units 2300, i.e., 2,000.

The update data map table 3300 employs a page number 3301, a chip number 3302, and a plane number 3303 in order to express 128 update destination pages. Every time update data emerges in the relevant group data in response to a write request command from the outside of the device, an update-target sector 3304, an original address 3305, and an update destination page state 3306 are recorded regarding the update destination page where the update data is recorded.

The update-target sector 3304 shows 0 or 1 regarding whether each of four sectors (sectors 0 to 3) included in an update destination page is stored with update data. 1 indicates "stored" and 0 indicates "not stored." For example, 0010 indicates that only sector 2 stores update data. The original address 3305 shows the W value expressed by the above formula. The update destination page state 3306 shows "blank" when an update destination page is in an unwritten state, "valid" when the update destination page stores the latest update data, and "invalid" when the update destination page stores old update data. As update data is recorded continuously, the update destination pages in the "blank" update destination page state 3306 are being consumed accordingly. Also, when the data in the sector for the same original address is updated twice or more, the update destination page state 3306 for the update destination page recording not-latest update data becomes "invalid."

In FIG. 8, for example, data A0 in sector 2 in the page with W=1 is updated to A1, one page is selected in the unwritten area (here, page 60 in chip 0 in plane 0), and A1 is programmed in sector 2 in the page. Data in the three sectors, which have not been updated in the page with W=1, do not need to be subject to recording, and therefore, the three sectors other than the sector for A1 are not subject to programming. As a result, the state 3306 for the update destination page recording A1 becomes "valid."

For example, when data B0 in sector 1 and data C0 in sector 2 in the page with W=36 are updated to B1 and C1 respectively, one page is selected in the unwritten area (here, page 60 in chip 0 in plane 1), and B1 and C1 are programmed respectively into sectors 1 and 2 in the page. Data in the two sectors, which have not been updated in the page with W=36, do not need to be subject to recording, and therefore, the two sectors other than the sectors for B1 and C1 are not subject to programming. As a result, the state 3306 for the update destination page recording B1 and C1 becomes "valid."

FIG. 8 also shows the state where data D0 in sector 2 in the page with W=32 is updated to D1; data E0 in sector 0 and data F0 in sector 1 in the page with W=35 are updated to E1 and F1 respectively; and data G0 in sector 2 and data H0 in sector 3 in the page with W=30 are updated to G1 and H1 respectively.

When data B1 in sector 1 and data C1 in sector 2 for the page with W=36 are updated respectively to B2 and C2, one page is selected in the unwritten area (here, page 60 in chip 2 in plane 1), and B2 and C2 are programmed into sector 1 and sector 2 in the page. As a result, the state 3306 for the update destination page recording B2 and C2 becomes "valid" 3310, and the state 3306 for the update destination page recording B1 and C1 becomes "invalid" 3311.

Incidentally, as shown in FIG. 4, each page in each flash memory chip includes the redundant section (information pieces) 1520 to 1523. An update destination page is programmed to include the corresponding original address W in the redundant section (information pieces) 1520 to 1523. The information is read by the memory controller 1020 when the semiconductor storage device 1000 is started-up, and is used for creating the update data map table 3300.

Figure 10:
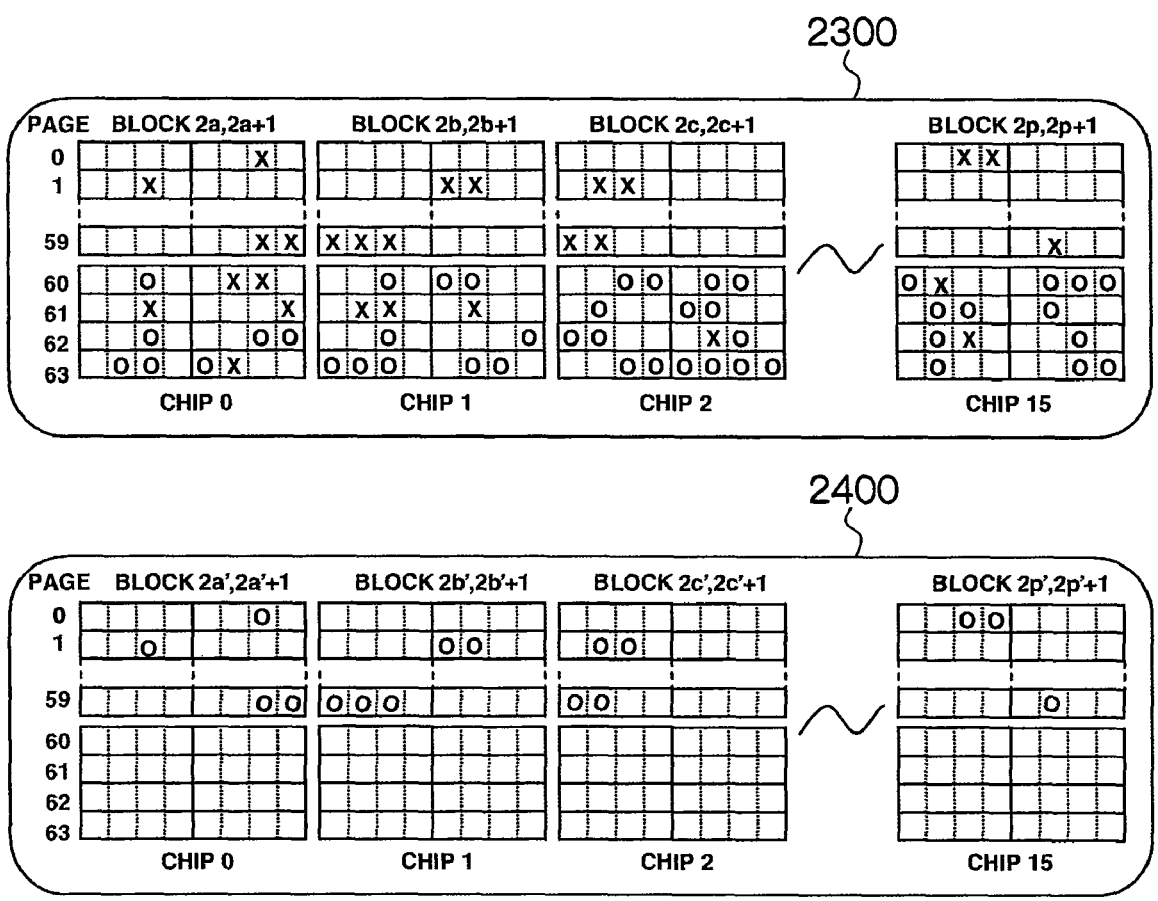
FIG. 10 is a diagram explaining a method of merging the update data recorded in a standard block unit according to the invention into group data and copying the resultant group data to a spare block unit.

The upper diagram in FIG. 10 shows the state of progress of update data recording performed until no unwritten page remains in the standard block unit 2300. In the diagram, "X" in the original data pages 1470 represents updated sector data; "X" in the update data pages 1480 represents non-latest update sector data; and "O" in the update data pages 1480 represents the latest update sector data. When update data further emerges for the group data assigned to the standard block unit 2300, there is no place to record the update data. Therefore, the memory controller 1020 reserves a new place for recording by using the spare block unit 2400. More specifically, the latest update data corresponding to the data shown by X in the original data pages 1470 in the standard block unit 2300 is found in the data shown by O in the update data pages 1480 by referring to the update data map table 3300, and the page data in which the X parts have been replaced by "O" is made, and the page data is copied to the same page address in the spare block unit 2400. Hereinafter, this procedure will be referred to as merge copy. Also, the un-updated page not including any X part is copied to the same page address in the spare block unit 2400 without change. The above copy procedure is executed for all the pages in the group data.

The lower diagram in FIG. 10 shows the state in which group data copy has been completed for all the pages in the spare block unit 2400. In the same diagram, the sector represented by "O" in the original data pages 1470 indicates that the latest update data is stored in the sector. At this point, the update data pages 1480 are all in an unwritten state. The update data pages 1480 serve as a new destination for update data for the relevant group data.

FIG. 11 is a diagram showing the post-rewrite state of the block map table and the update data map table for the relevant group via the above copy procedure. In a block map table 4200, two adjacent block addresses 4202 for each chip 4201 are rewritten into the addresses for two adjacent blocks for each of the chips constituting the spare block unit 2400. In an update data map table 4300, the items for the update-target sector 4304 and the original address 4305 are cleared for all the 128 entries expressed by a page number 4301, a chip number 4302, and a plane number 4303, and "blank" is set for the update destination page state 4306.

FIGS. 12 to 15 are diagrams showing an example of the detailed procedure for execution of the above-described merge copy processing in a page in the flash memory chips 1100 to 1115.

Regarding two sets of page data {J0, K0, L0, M0} and {S0, T0, U0, V0} stored in page 2 of two adjacent blocks (numbers are 2x and 2x+1) in chip 11, this example shows the case where, in the state in which the latest update data K1, L1 for sector data K0, L0 have been recorded in page 60 of block 2w+1 in chip 3; and the latest update data U1, V1 for sector data U0, V0 have been recorded in page 60 of block 2z in chip 7, the two pages are subject to merge copy to page 2 of another two adjacent blocks (numbers are 2y and 2y+1).

Figure 12:
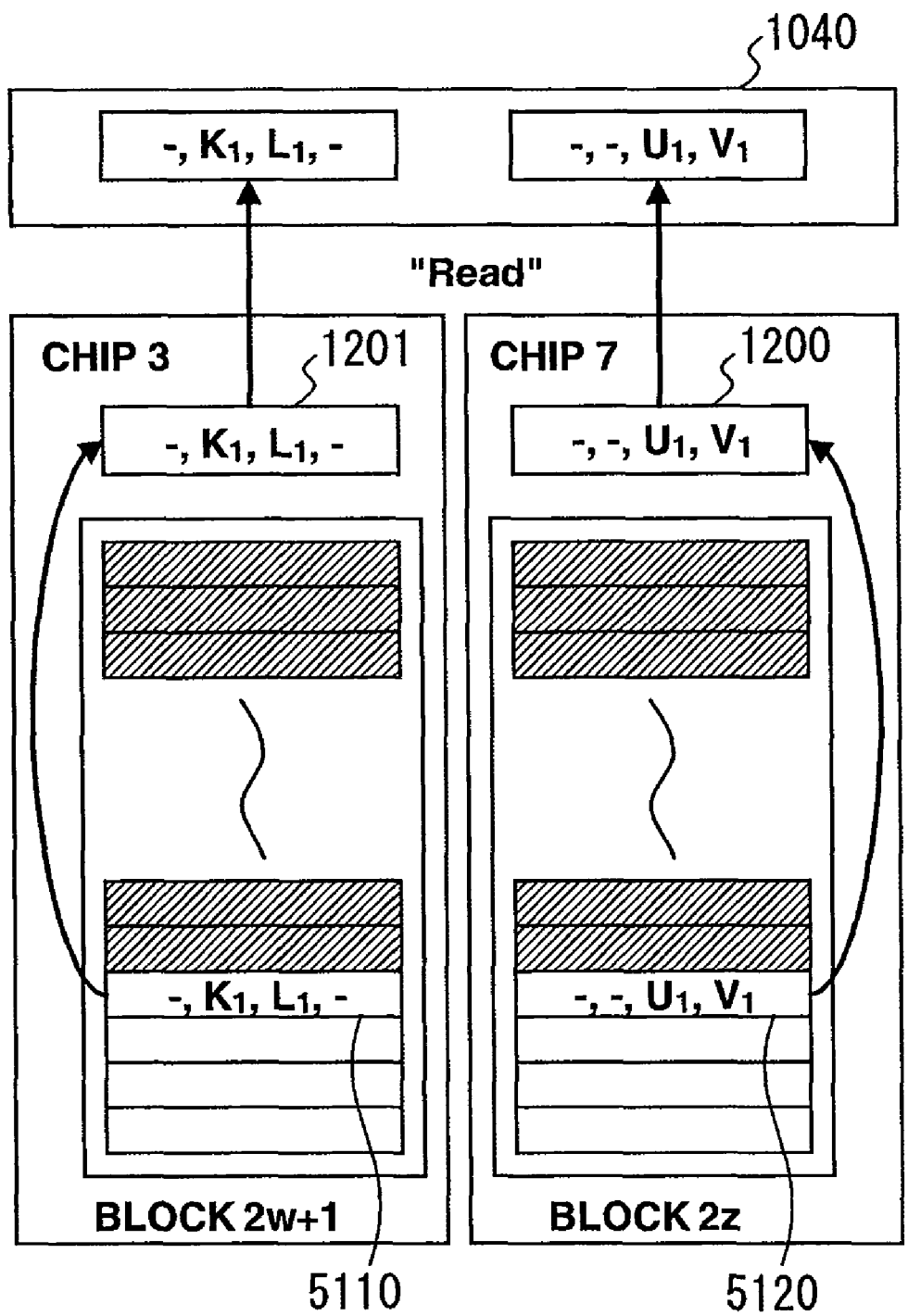
FIG. 12 is a diagram showing a procedure in accordance with a read command, the procedure being performed on a flash memory chip during update data merge copy processing according to the invention.

First, as shown in FIG. 12, when the memory controller 1020 issues the flash memory commands "Read" to page 5110 in chip 3 including K1, L1 and page 5120 in chip 7 including U1, V1, the data for the two pages is read out to the respective page registers 1201 and 1200 in the chips. Then, the necessary sector data K1, L1, U1, and V1 are transferred to the temporary data buffer 1040.

Figure 13:
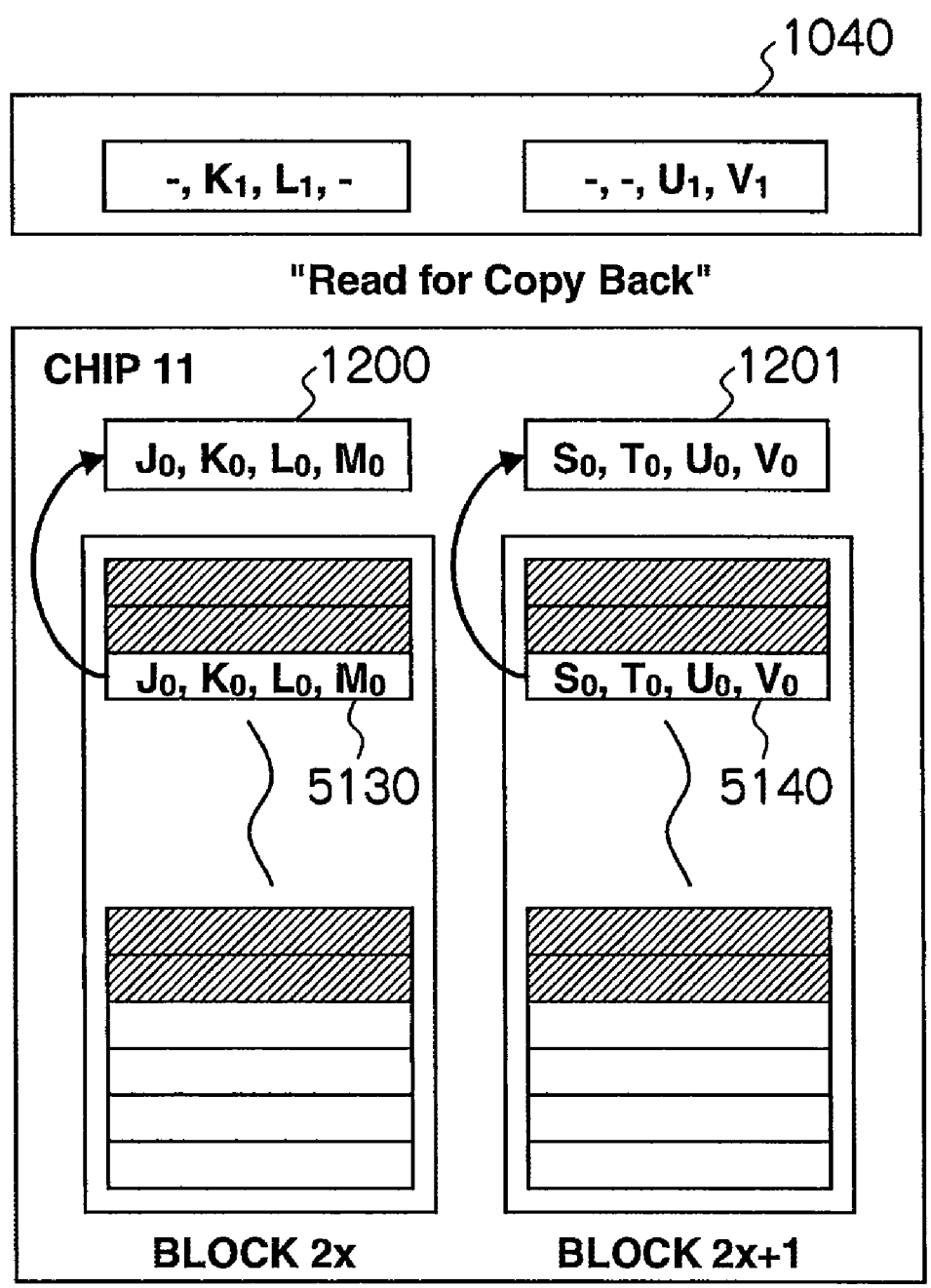
FIG. 13 is a diagram showing a procedure in accordance with a read for copy back command, the procedure being performed on a flash memory chip during update data merge copy processing according to the invention.

Next, as shown in FIG. 13, when the memory controller 1020 issues the flash memory commands "Read_for_Copy-_Back" to page 5130 storing {J0, K0, L0, M0} and page 5140 storing {S0, T0, U0, V0}, the data for the two pages is sequentially read out to the respective page registers 1200 and 1201 in the chips.

Figure 14:
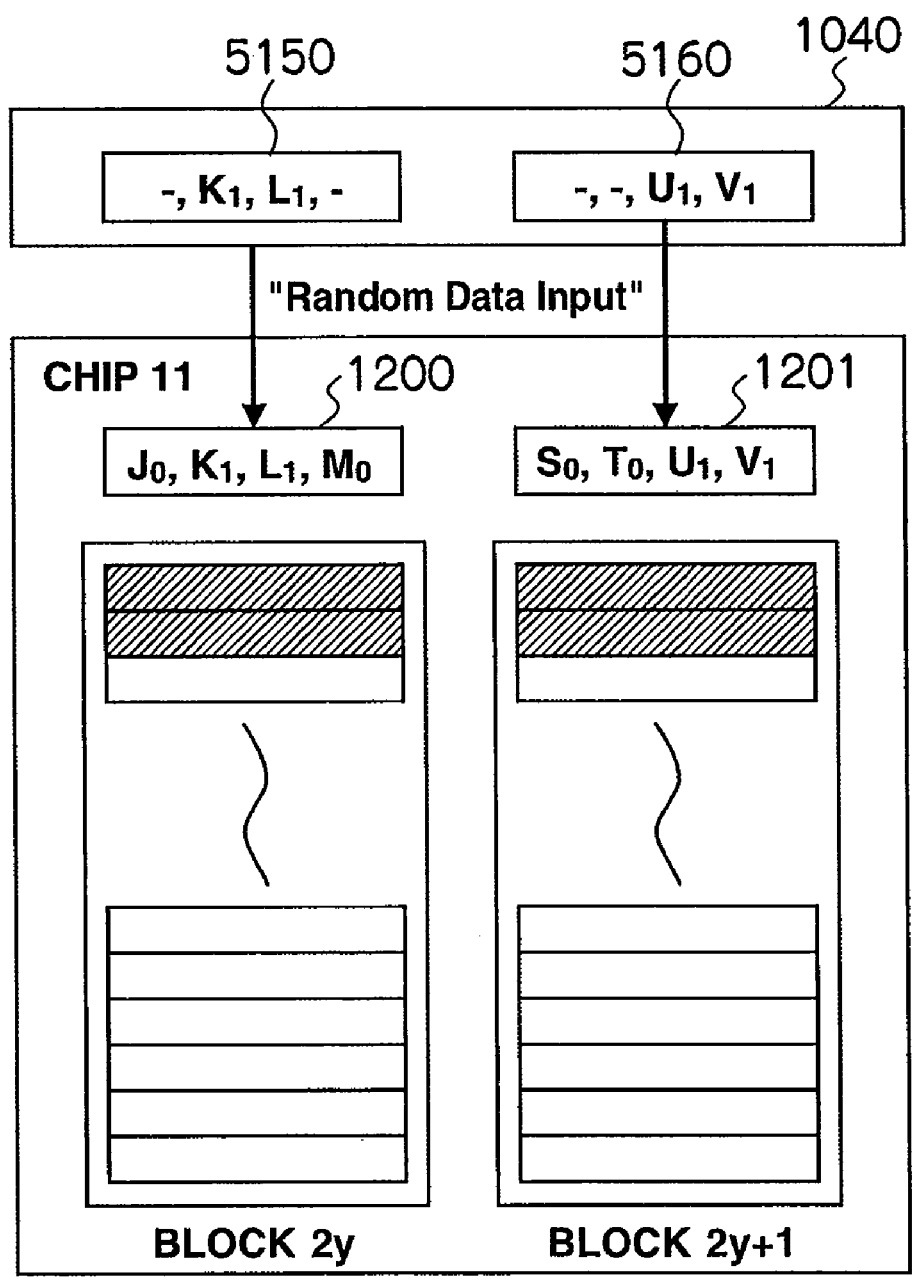
FIG. 14 is a diagram showing a procedure in accordance with a random data input command, the procedure being performed on a flash memory chip during update data merge copy processing according to the invention.

Then, as shown in FIG. 14, when the memory controller 1020 issues the flash memory commands "Random_Data_Input" to the page registers 1200 and 1201, sector data K1, L1 (5150) in the temporary data buffer 1040 are written over K0, L0 in the page register 1200. Subsequently, U1, V1 (5160) are written over U0, V0 in the page register 1201. In this way, update data is merged to the data for each page.

Figure 15:
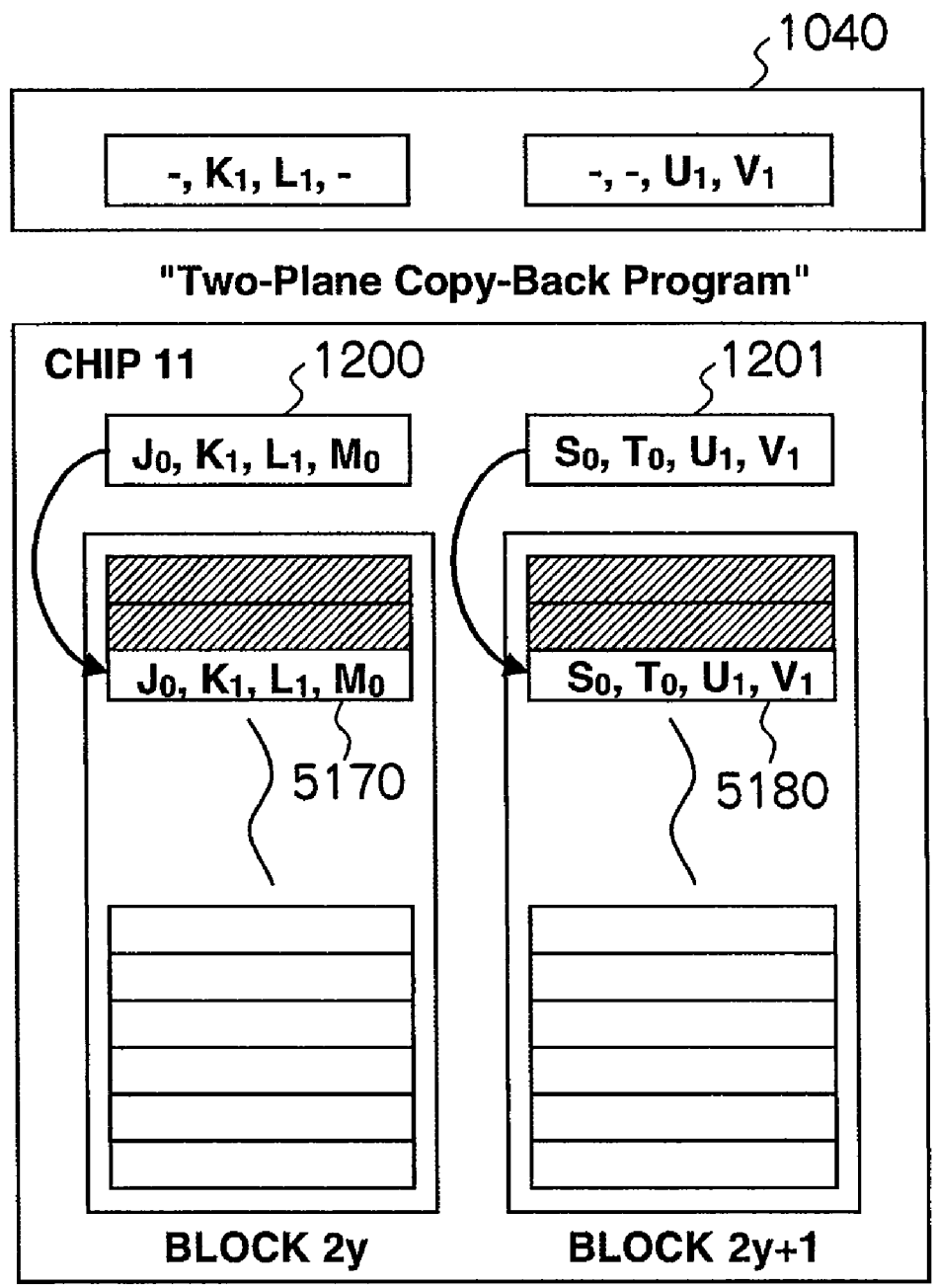
FIG. 15 is a diagram showing a procedure in accordance with a two-plane copy-back program command, the procedure being performed on a flash memory chip during update data merge copy processing according to the invention.

Finally, as shown in FIG. 15, when the memory controller 1020 issues the flash memory commands "Two-Plane_Copy-Back_Program" to pages 2 (5170 and 5180) in block 2y and block 2y+1 respectively, the page data in the page registers 1200 and 1201 (i.e., result of merge) are simultaneously programmed into the relevant pages 2.

As described above, the memory controller 1020 uses the flash memory commands utilizing the page registers 1200 and 1201, thereby being capable of keeping the data transfer between the temporary data buffer 1040 and the chips to a minimum. This method minimizes the data transfer time in merge copy processing, which brings about the improvement in performance of the semiconductor storage device 1000.

Incidentally, when the page with no update data in group data is copied from the standard block unit 2300 to the spare block unit 2400, only the two steps shown in FIGS. 13 and 15 are executed.

The memory controller 1020 issues flash memory commands in parallel to the 16 flash memory chips mounted in the semiconductor storage device 100, thereby executing the above-described copy processing. A problem that arises at this point is that, when the amounts of commands to be executed (command tasks) are weighted toward a certain chip, the other chips enter an idle state. The processing time for conducting the entire copy in the block unit becomes longer the larger the number of chips in the idle state and the longer they are in the idle state. This command task bias causes deterioration in performance of the semiconductor storage device 1000. The above copy processing is executed in response to a write request command to the semiconductor storage device 1000. Therefore, this leads to deterioration in write performance. In order to remedy this problem, the command tasks need to be equally distributed over all the chips.

An analysis of this problem in the semiconductor storage device 1000 will be shown in with reference to FIGS. 16 to 18, and the method for solving the problem will be described with reference to FIG. 19.

Figure 16:
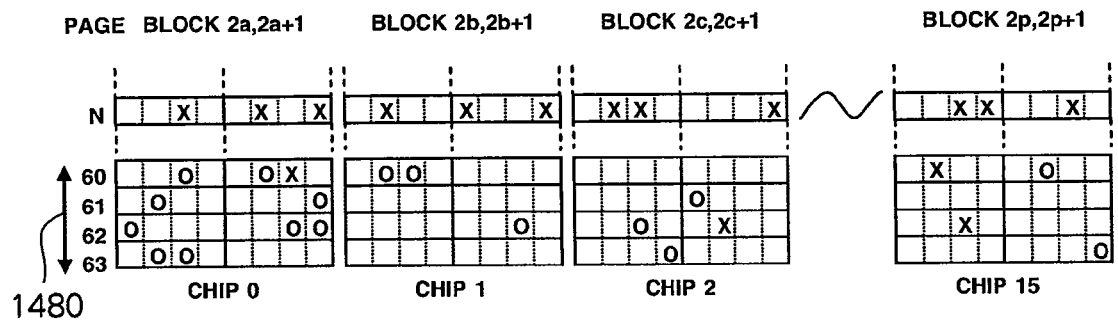
FIG. 16 is a diagram explaining the problems in merge copy performance and read performance that emerge due to the biased recorded state of update data according to the invention.

FIG. 16 shows an example where command tasks are weighted toward chip 0 in the situation in which merge copy is executed concerning page N (here, N=0 to 59) in the standard block unit. In the drawing, X in page N represents updated sector data, and O in the update data pages 1480 represents the latest update data having its original address in page N. The drawing shows that chip 0 has as many as seven pages including update data to be read in response to the "Read" commands (see FIG. 12), while the other chips each have only two or three such pages.

Figure 17:
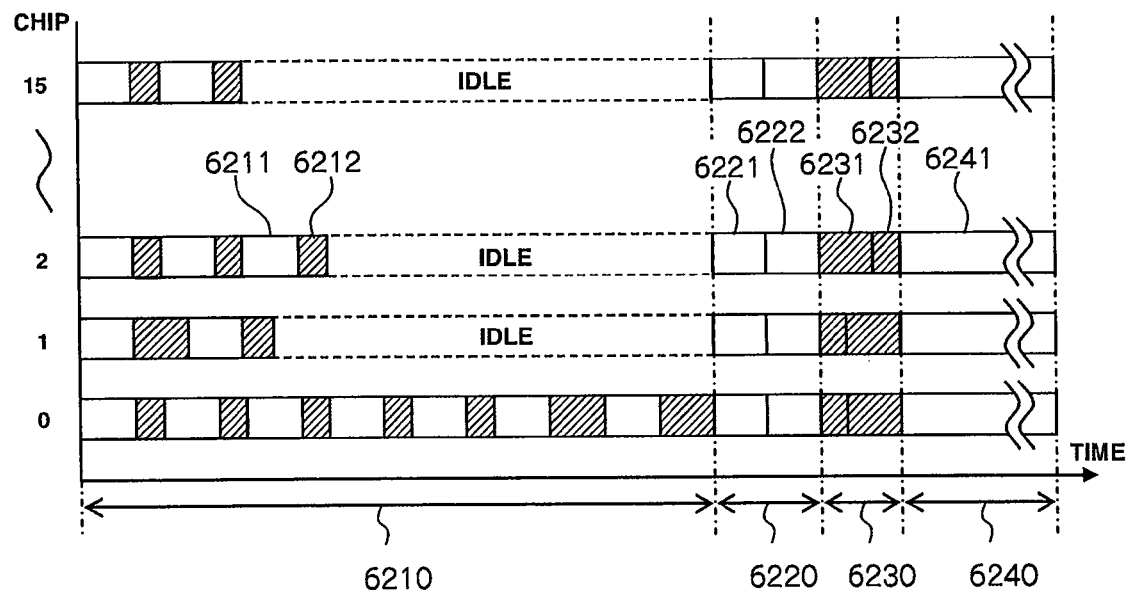
FIG. 17 is a diagram explaining the problems in merge copy performance and read performance that emerge due to the biased recorded state of update data according to the invention.

FIG. 17 shows the command tasks for the chips in chronological order in the execution of merge copy for page N. Here, time 6210 is a processing time for reading out the latest update data from the update data pages 1480 to the temporary data buffer 1040. In the time 6210, the time shown in white (about 25 microseconds) like time 6211 is a time for reading out data to the page register. The time shown by diagonal lines like time 6212 is the time for transferring data to the temporary data buffer 1040. The time is about 13 microseconds for each sector. Time 6220 is a processing time (about 50 microseconds) for reading out the page data in page N in the standard block unit to the page register. In the time 6220, time 6221 is the time (about 25 microseconds) for reading out the data in the page in plane 0, and time 6222 is the time (about 25 microseconds) for reading out the data in the page in plane 1. Time 6230 is a processing time for transferring the update data in the temporary data buffer 1040 to the page register to be merged into page data. In the time 6230, time 6231 is the time for transferring data to the page resister on the side of plane 0. Time 6232 is a time for transferring data to the page register on the side of plane 1. These times each are about 13 microseconds for each sector. Time 6240 is a processing time 6241 (about 200 microseconds) for writing the merge result on the page register into page N in the spare block unit. As described above, the processing time for reading out the update data in chip 0 to the temporary data buffer 1040 is longer than the processing time for each of the other chips. This brings about the idle state in the other chips. This becomes the cause of deterioration in write performance. Therefore, if the all the chips were equally assigned to serve as record destinations for the update data with their original addresses in the same line, the time 6210 would be shortened, which would prevent the deterioration in write performance.

Note also that, as in the above example, when the latest update data for the sector data in a specific page (i.e., specific line in a logical address space) in a standard block unit is disproportionately recorded in a certain chip, this may also be the cause of deterioration in read performance.

Figure 18:
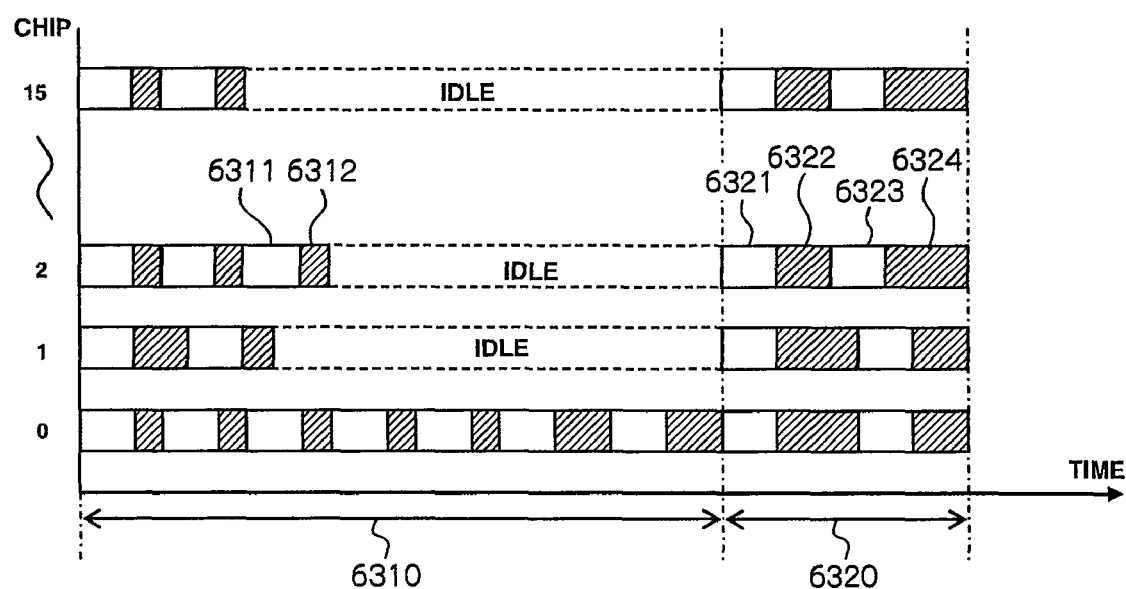
FIG. 18 is a diagram explaining the problems in merge copy performance and read performance that emerge due to the biased recorded state of update data according to the invention.

FIG. 18 shows the command tasks for the chips in chronological order when the read request command for the entire line N (32 pages) is issued to the semiconductor storage device 1000 in the recorded state as shown in FIG. 16. Here, time 6310 is a processing time for reading out the latest update data from the update data pages 1480 to the host data buffer 1030. In the time 6310, the time shown in white (about 25 microseconds) like time 6311 is the time for reading data to the page register. The time shown by diagonal lines like the time 6312 is the time for transferring data to the host data buffer 1030. These times are each about 13 microseconds for each sector. Time 6320 is a processing time for reading out the page data in page N (with the proviso that updated sector data is excluded) in the standard block unit to the host data buffer 1030. In the time 6320, time 6321 is the time (about 25 microseconds) for reading out the data to the page register on the side of plane 0, and time 6322 is the time for transferring data from the above page register to the host data buffer 1030. Time 6323 is the time (about 25 microseconds) for reading out data to the page register on the side of plane 1. Time 6324 is the time for transferring data from the above page register to the host data buffer 1030. The time 6322 and the time 6324 are each about 13 microseconds for each sector. As described above, the processing time for reading out the update data in chip 0 to the host data buffer 1030 is longer than the processing time for each of the other chips. This brings about the idle state in the other chips. This also becomes the cause of deterioration in read performance. Therefore, if the all the chips were equally assigned to serve as record destinations for the update data with their original addresses in the same line, the time 6310 would be shortened, which would prevent the deterioration in read performance.

Figure 19:
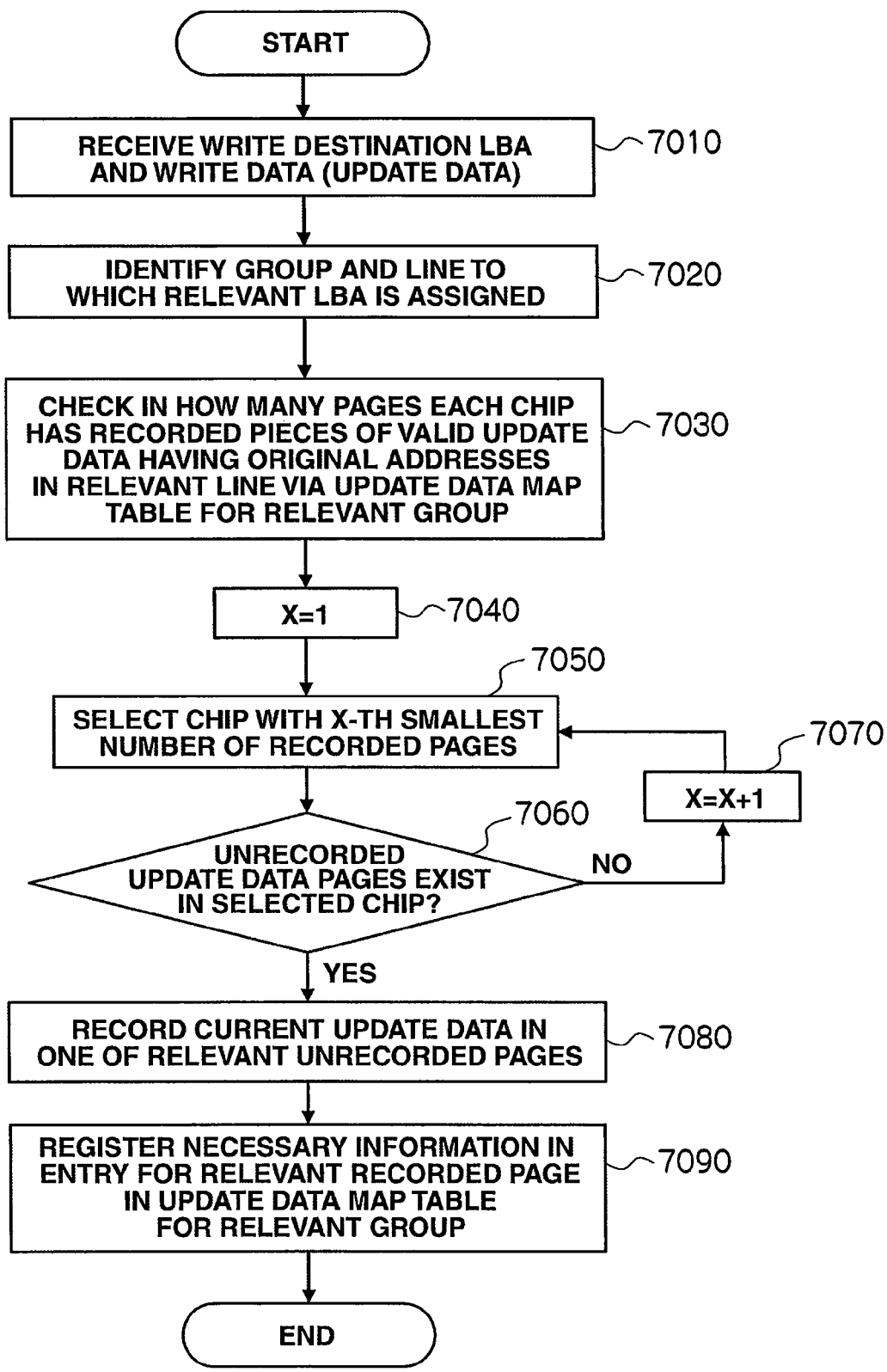
FIG. 19 is a flowchart showing update data recording processing executed by a memory controller according to the invention.

FIG. 19 shows a procedure for the processing executed by the memory controller 1020. This processing is executed when, upon receiving a write request command, the semiconductor storage device 1000 records the relevant write data as update data in the update data pages 1480.

The memory controller 1020 receives a write-destination LBA and write data (i.e., update data) via a write request command (7010), and identifies the group number and line number that store the update-source page in accordance with the LBA value via numeric calculation (7020). Then, the memory controller 1020 refers to all the entries that are in the "valid" state in the update data map table (3300, 4300, etc.) for the relevant group, and examines for how many pages each of the 16 chips records the effective update data having the original address in the relevant line (7030).

Next, the memory controller 1020 initializes integer X to 1 (7040). The memory controller 1020 selects the chip with the X-th smallest number of recorded pages based on the findings at step 7030 (7050). The memory controller 1020 retrieves the entries that are in the "blank" state from the update data map table for the relevant group, and judges whether there is at least one unrecorded update data page in the selected chip (7060). If there is no unrecorded page (7060: No), the memory controller 1020 adds 1 to integer X (7070), and returns to step 7050.

If there are unwritten pages at step 7060 (7060: Yes), the memory controller 1020 refers to the block map table (3200, 4200, etc.) for the relevant group, identifies the block number for the selected chip, selects one of the unrecorded pages in the block, and records (programs) the current update data in the selected page (7080).

Finally, the memory controller 1020 changes the "blank" state to the "valid" state in the entry for the above recorded page in the update data map table for the relevant group, and registers necessary information about, e.g., the update-target sector and original address (7090). This is the end of the processing.

According to this embodiment, all the chips can be equally assigned to serve as recording destinations for the update data with their original addresses in the same line. As a result, in the flash memory chips that operate in parallel in the processing for the data write/read request commands, the time during which the chip waits a flash memory command (idle time) is reduced. Therefore, the deterioration in write/read performance of the semiconductor storage device 1000 can be prevented.

Note that the above description has shown the case where the sector size for the update data received in response to the write request command from the outside of the device falls within one page. However, even when the sector size for update data covers plural pages, it is possible that the update data is divided into page units (four sector units); and the above data update processing is executed on the update in each page unit. Accordingly, the effects of the invention are clearly obtained.

Also, in the above embodiment, the present invention is utilized in the semiconductor storage device 1000 having the memory controller 1020 and the flash memory chips 1100 to 1115.

The memory controller 1020 is connected to the flash memory chips 1100 to 1115 to control the flash memory chips 1100 to 1115. Each of the flash memory chips 1100 to 1115 includes the blocks 1300 to 1311 collectively erasable in accordance with an order from the memory controller 1020. The blocks 1300 to 1311 each are composed of the pages 1400 to 1463 that serve as write units for the memory controller 1020.

The memory controller 1020 includes: the first division unit that divides the blocks 1300 to 1311 into the first page set (the pages 1400 to 1495) composed of plural pages and the second page set (the pages 1460 to 1463) composed of plural pages to create the state shown in FIG. 3; the second division unit that divides a logical address space into the plural groups 2000 to 2010 (2,000 groups with numbers 0 to 1999) and divides each of the groups 2000 to 2010 into the lines 2100 to 2163 to create the state shown in FIG. 4; the management unit (FIGS. 6 and 7) that creates plural block units—each of which is obtained by assembling a predetermined number of blocks from the blocks in each of the flash memory chips 1100 to 1115—and manages a predetermined number of block units from the block units as the standard block units 2300 and the block units other than the standard block units as the spare block units 2400; and the storage unit (the tables 3200 and 3300 in FIG. 9) that makes the standard block units 2300 correspond to the groups respectively and stores the corresponding group data in the pages in the first page set in each of the blocks constituting each of the standard block units 2300.

The semiconductor device 1000 has been explained for the case where the pages in the second page set in each of the blocks constituting the standard block unit 2300 include the unwritten pages for recording the update data for the corresponding group data. However, the invention is not limited to this case.

Moreover, the memory controller 1020 has been described for the case where the memory controller 1020 executes control (FIG. 19) to receive a write destination logical address and write data in response to a write command the semiconductor storage device 1000 has received from, e.g., a host; identify the group and the line that include the logical address; select a flash memory chip that satisfies the predetermined condition concerning the second page set from among the flash memory chips 1110 to 1115; and write the write data in the unwritten page in the second page set in the selected flash memory chip as update data for the data in the identified line in the identified group. However, the invention is not limited to this case.

Furthermore, the memory controller 1020 has been described for the case where the memory controller 1020 includes the tables 3200 and 3300 that manage the information about the update data for group data in order to make an evaluation concerning the predetermined condition; and the tables 3200 and 3300 are made in the volatile RAM in the memory controller 1020. However, the invention is not limited to this case.

The invention can be widely utilized in semiconductor storage devices and methods of controlling such semiconductor storage devices.

What is claimed is:

1. A semiconductor storage device, comprising:
a plurality of flash memory chips; and
a memory controller connected to the flash memory chips to control the plurality of flash memory chips,
wherein each of the plurality of flash memory chips includes a plurality of physical blocks collectively erasable,
wherein each of the plurality of physical blocks is composed of a plurality of physical pages that serve as units for writing instructed from the memory controller,
wherein the memory controller divides the plurality of physical pages in each physical block of the plurality of physical blocks into a first physical page set and a second physical page set,
wherein the memory controller divides a logical address space corresponding to the plurality of physical blocks into a plurality of logical groups,
wherein the memory controller divides each logical group of the plurality of logical groups into a plurality of lines,
wherein the memory controller allocates a number of physical blocks from each of the plurality of flash memory chips to each of the plurality of lines,
wherein the memory controller creates a standard block unit which is configured by a predetermined number of the physical blocks in each of the plurality of flash memory chips, and manages a spare block unit which is configured by a predetermined number of the physical blocks in each of the plurality of flash memory chips other than the physical blocks of the standard block unit,
wherein the memory controller allocates the standard block unit as to correspond to a logical group from the plurality of logical groups and stores the data for the corresponding logical group in the physical pages in the first physical page set in each of the physical blocks constituting the standard block unit, wherein the memory controller manages the physical pages in the second physical page set in each of the physical blocks constituting the standard block unit as unwritten physical pages for recording update data for the corresponding data stored in the first physical page set and updates data until no unwritten physical page remains in the second physical page set, wherein the memory controller copies valid update data in the standard block unit to the spare block unit, if no unwritten physical page remains in the second physical page set in the standard block unit, and alternates the spare block unit as a new standard block unit, the update data being designated as valid update data when the standard block unit stores the latest update data and invalid when the standard block unit stores old update data, wherein the memory controller determines, for each of the plurality of flash memory chips, the number of recorded pages for the valid update data, wherein, in response to a write command, the memory controller specifies one of the flash memory chips that has at least one unwritten physical page in the second physical page set belonging to the standard block unit corresponding to the logical group, wherein the specified flash memory chip is that which, of the plurality of flash memory chips, has the smallest number of recorded pages for the valid update data for the data in a certain line of the plurality of lines, and wherein the memory controller equally assigns all of the flash memory chips to serve as recording destinations for the valid update data which has an original logical address in the certain line.

2. The semiconductor storage device according to claim 1, wherein the memory controller erases data stored in the physical blocks corresponding to the standard block unit after alternating the spare block unit and the standard block unit.

3. The semiconductor storage device according to claim 2, wherein the memory controller manages the erased physical blocks to be candidate blocks of a new spare block unit.

4. The semiconductor storage device according to claim 1, wherein the memory controller creates the standard block unit by selecting adjacent physical blocks in each flash memory chip.

5. The semiconductor storage device according to claim 1, wherein the plurality of physical blocks are collectively erasable in accordance with an order from the memory controller.

* * * * *